US008549457B1

(12) United States Patent
Moore et al.

(10) Patent No.: US 8,549,457 B1
(45) Date of Patent: Oct. 1, 2013

(54) METHOD AND SYSTEM FOR IMPLEMENTING CORE PLACEMENT

(75) Inventors: Timothy P. Moore, Mountain View, CA (US); Thaddeus C. McCracken, Portland, OR (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 13/219,553

(22) Filed: Aug. 26, 2011

(51) Int. Cl.
*G06F 17/50* (2006.01)

(52) U.S. Cl.
USPC .......................................... 716/123; 716/119

(58) Field of Classification Search
USPC .................................................. 716/119, 123
See application file for complete search history.

(56) References Cited

U.S. PATENT DOCUMENTS

| | | | |
|---|---|---|---|
| 7,966,595 B1 * | 6/2011 | Chong et al. | 716/118 |
| 2010/0031218 A1 * | 2/2010 | Ramsour et al. | 716/10 |
| 2010/0131913 A1 * | 5/2010 | Zou et al. | 716/9 |
| 2011/0246958 A1 * | 10/2011 | Verma et al. | 716/122 |

OTHER PUBLICATIONS

Wang et al., "Optimal Floorplan Area Optimization", Aug. 1992.
Ng et al., "Solving Hard Instance of Floorplacement", 2006.
Wong et al., "A New Alforithm for Floorplan Design", 1986.
Murata et al., "Rectangle-Packing-Based Module Placement", 1995.
Chang et al., "B* -Trees: A New Representation for Non-Slicing Floorplans*", 2000.
Tang et al., "Fast-SP: A Fast Algorithm for Block Placement based on Sequence Pair", 2001.
Kleinhans et al., "Gordian: VLSI Placement by Quadratic Programming and Slicing Optimization", Mar. 1991.
Wu et al., "Rectilinear Block Placement Using B*-Trees", Apr. 2003, pp. 188-202.
Lin et al., "TCG: A Transitive Closure Graph-Based Representation for Non-Slicing Floorplans", Jun. 2001, 6 pages.
Chen et al., "A Transitive-Closure-Graph-Based Macro Placement Algorithm", 2007.
Lin et al., "VLSI Florrplanning with Boundary Constraints Using Generalized Polish Expression", 2006, pp. 383-389.
Sutanthavibul et al., "An Analytical Approach to Floorplan Design and Optimization", Jun. 1991, pp. 761-769.
Guo et al., "An O-Tree Representation of Non-Slicing Floorplan and Its Applications", 1999, pp. 268-273.
Chang et al., "Multi-level Placement for Large-Scale Mixed-Szie IC Designs", 2003, 6 pages.
Lin et al., "Module Placement with Boundary Constraint Using B*-trees", 2002.
Lin et al., "TCG-S: Orthogonal Coupling of P*-admissible Representations for General Floorplans", 2004, 6 pages.

(Continued)

*Primary Examiner* — Vuthe Siek
*Assistant Examiner* — Mohammed Alam
(74) *Attorney, Agent, or Firm* — Vista IP Law Group, LLP

(57) ABSTRACT

Disclosed is an improved method, system, and computer program product for performing core placement when presented with an I/O ring design. A multi-pass approach is taken to place and shape core objects into the available core area formed by the inner surface of the I/O ring. The multi-pass approach permits very fast placement of the core objects, which still provides for an accurate estimation of the die size and configuration requirements for the electronic design. Moreover, the present approach allows core objects to be placed in a way that retains any preferred affinities for the objects to be located near other objects, e.g., near specific I/Os on the I/O ring.

33 Claims, 23 Drawing Sheets

(56) References Cited

OTHER PUBLICATIONS

Lin et al., "Arbitrary convex and concave rectilinear module packing using TCG", 2002.

Law et al., "Block Alignment in 3D Floorplan Using Layered TCG", 2006, 6 pages.

Adya et al., "Unification of Partitioning, Placement and Floorplanning", 2004.

Wang et al., "Linear constraint graph for floorplan optimization with soft blocks" 2008, 7 pages.

Roy et al., "Satisfying White Space Requirements in Top-down Placement", Apr. 2006, 3 pages.

Adya et al., "Consistent Placement of Macro-Blocks Using Floorplanning and Standard-Cell Placement", Apr. 2002, 6 pages.

Khatkhate et al., "Recursive Bisection Based Mixed Block Placement", Apr. 2004, 6 pages.

Kim et al., "A Linear Programming-Based Algorithm for Floorplanning in VLSI Design", May 2003, pp. 584-592.

Chen et al., "MP-trees: A Packing-Based Macro Placement Algorithm for Mixed-Size Designs", Jun. 2007, pp. 447-452.

Maruvada et al., "Block Placement Using the Segment Tree Data Structure from Computational Geometry" 2002, 4 pages.

Chan et al., "Practical Slicing and Non-slicking Block-Packing without Simulated Annealing", Apr. 2004, 6 pages.

Hara et al., "Efficient Floorplanning by O-Tree with Genetic Algorithm", 2008, pp. 325-328.

Young et al., "A Unified Method to Handle Different Kinds of Placement Constraint in Floorplan Design", 2002, 7 pages.

Murata et al., "VLSI Module Placement Based on Rectangle-Packing by the Sequence-Pair", Dec. 1996, pp. 1518-1524.

Lin et al., "TCG: A Transitive Closure Graph-Based Representation for General Floorplans", 2003, pp. 12.

S. Sathiamoorthy, "LaySeq: A New Representation for Non-Slicing Floorplans", 2002, 9 pages.

Samaranayake et al., "A Force Directed Macro Cell Placement Tool", Jul. 2009, 6 pages.

\* cited by examiner

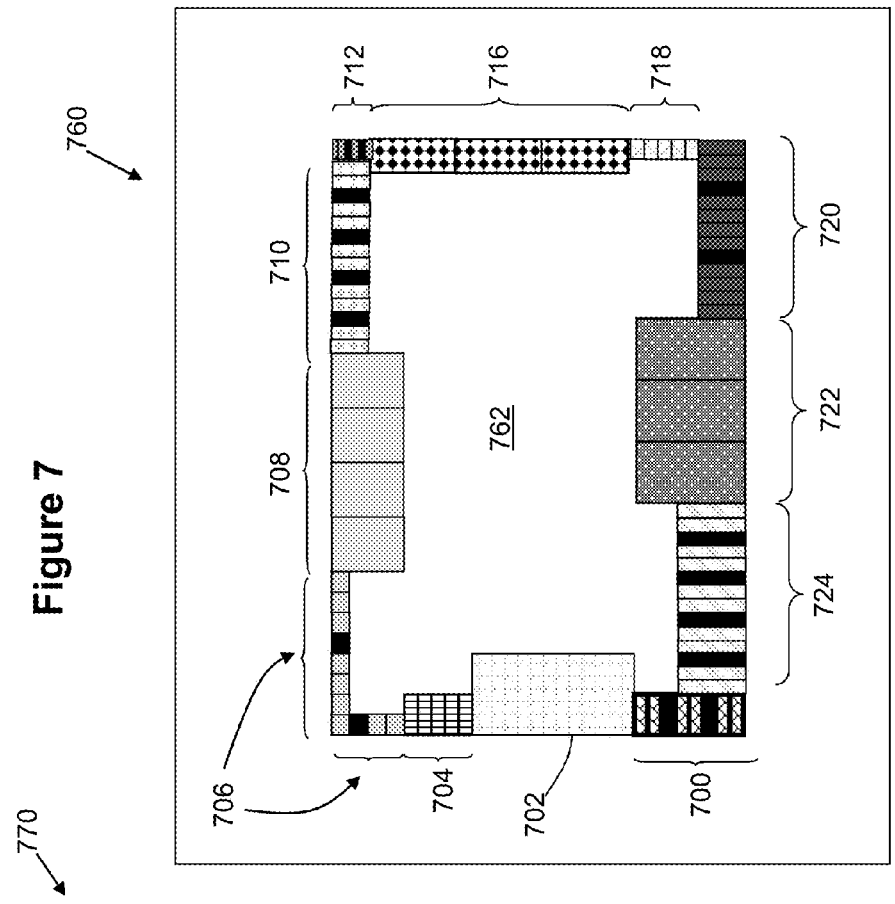
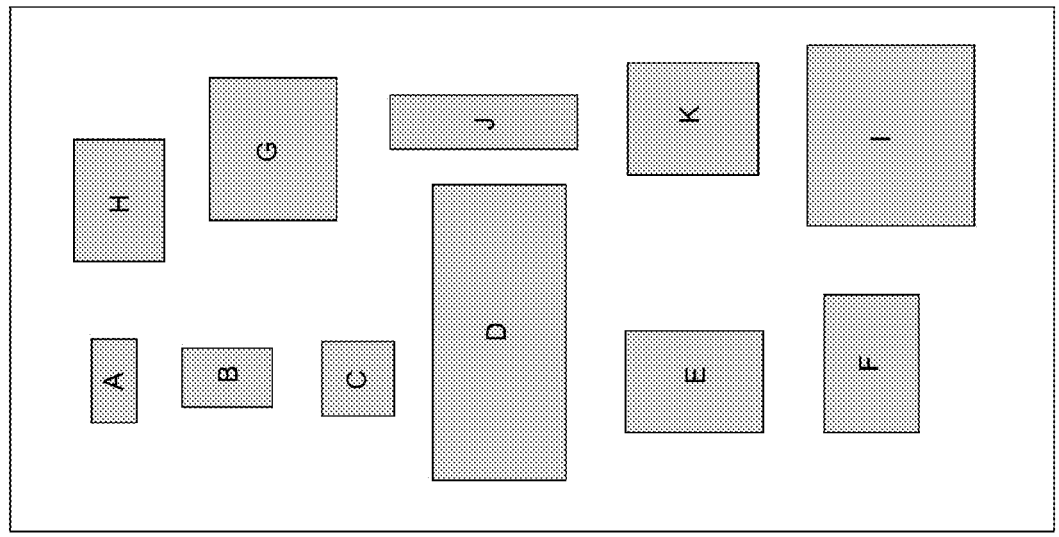
Figure 7

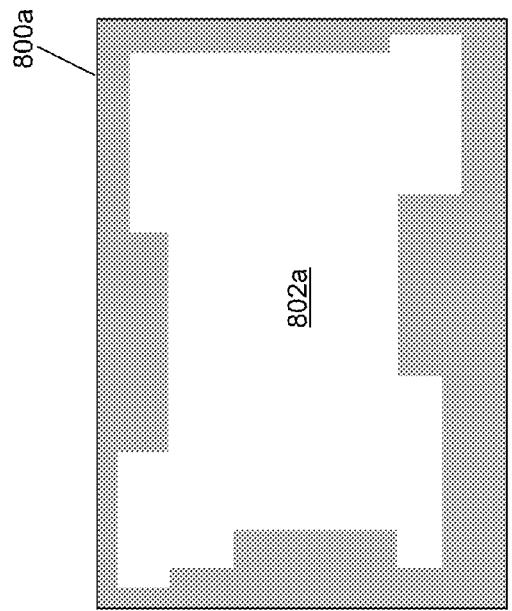
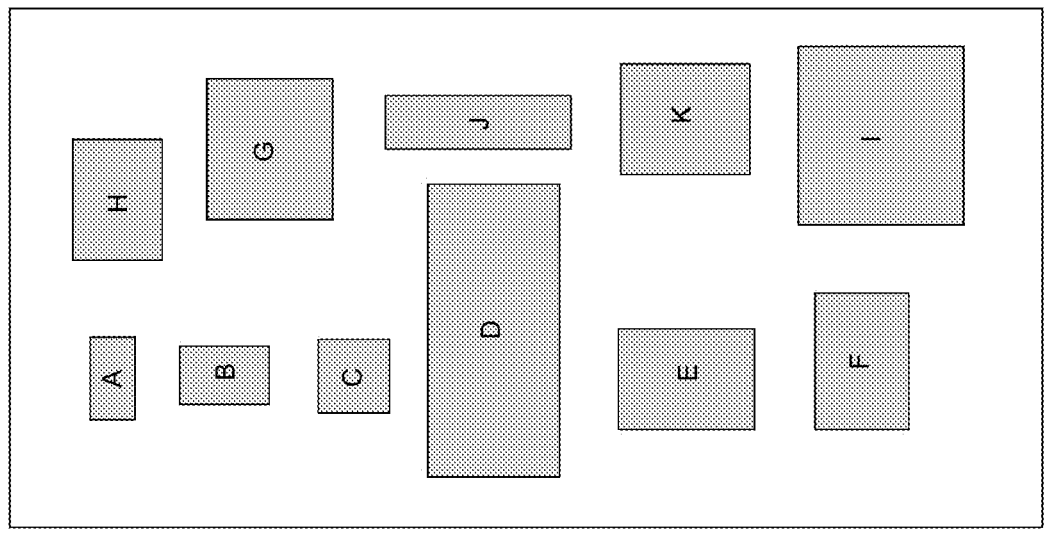
Figure 8A

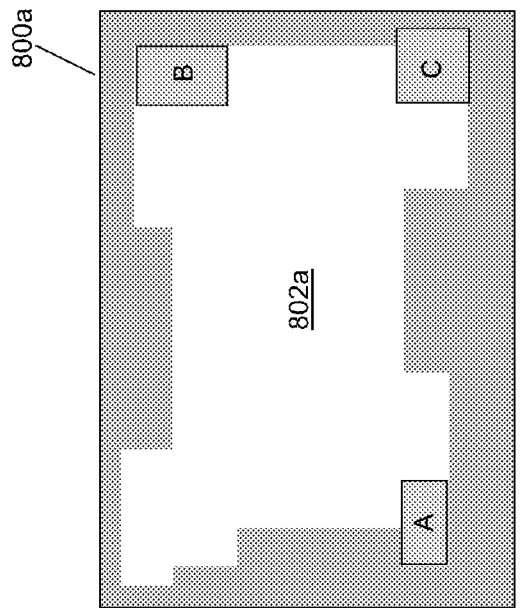
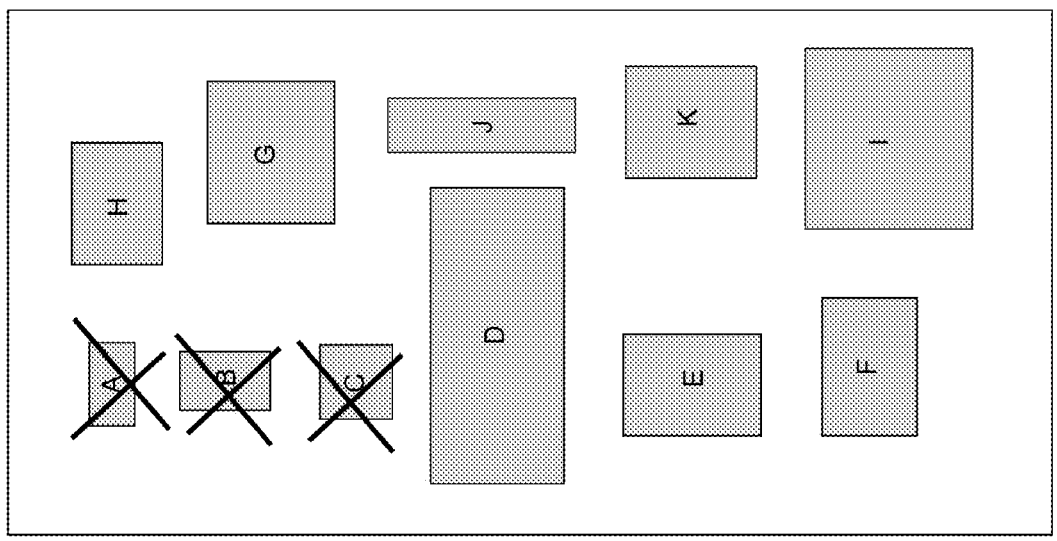
Figure 8B

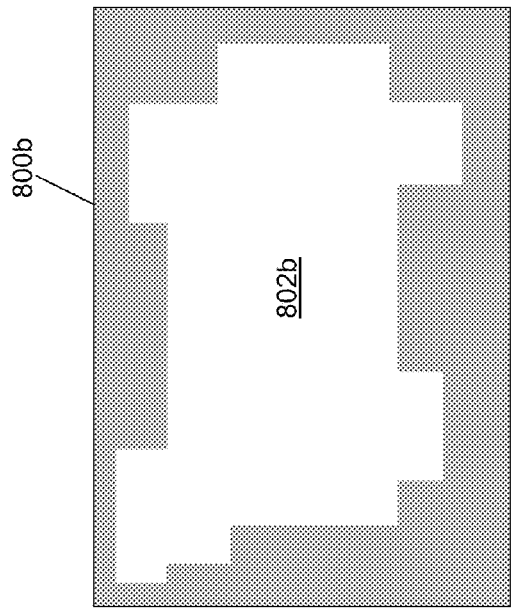
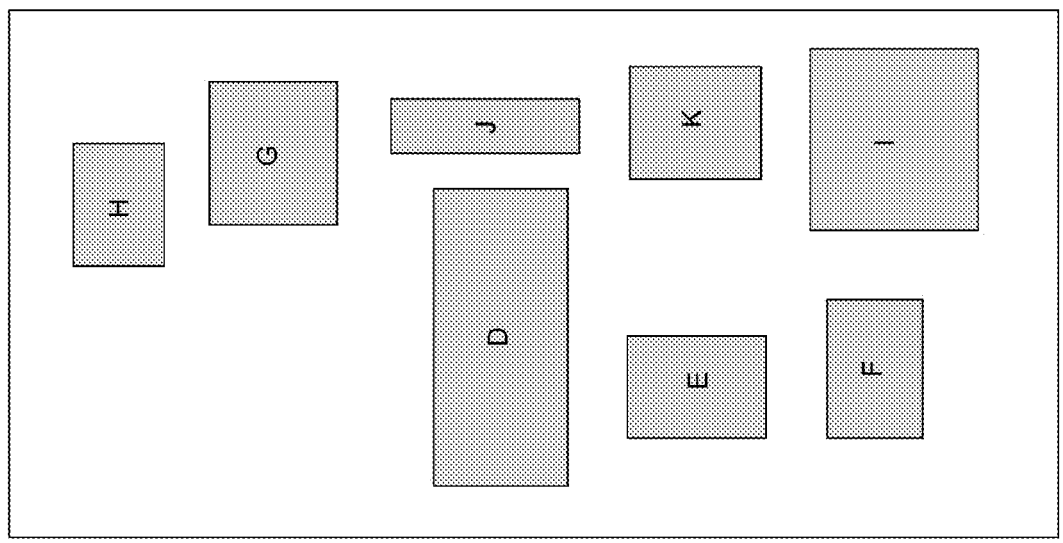
Figure 8D

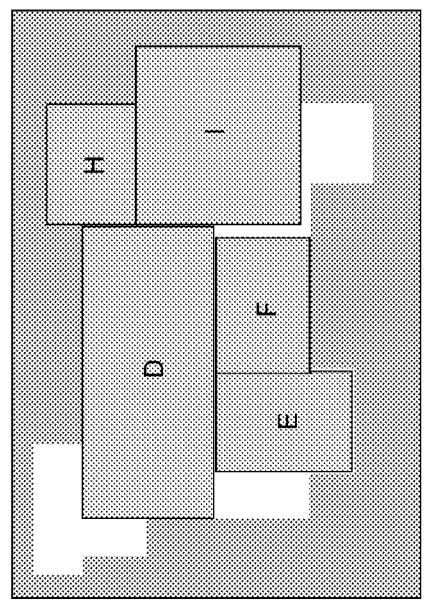
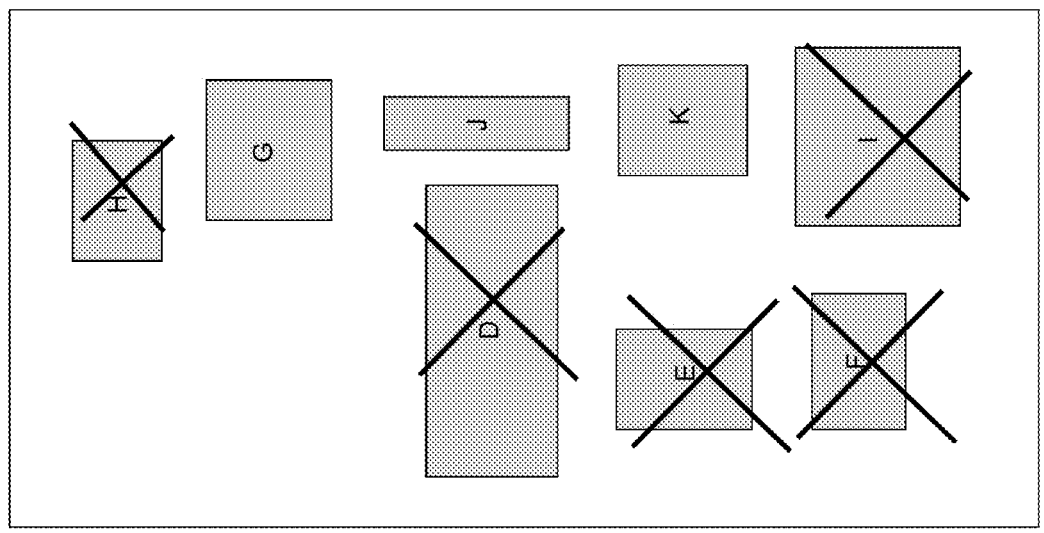
Figure 8E

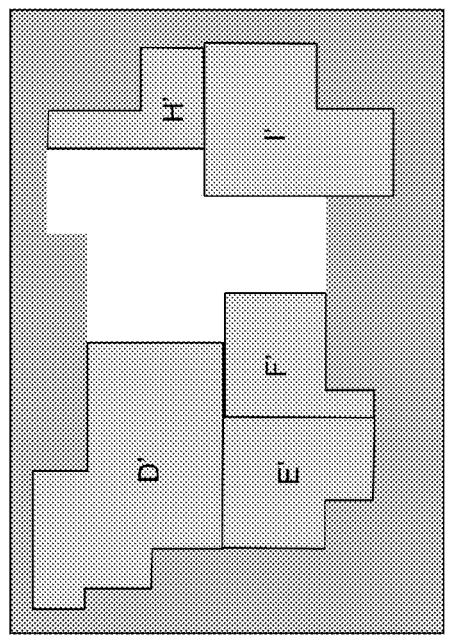
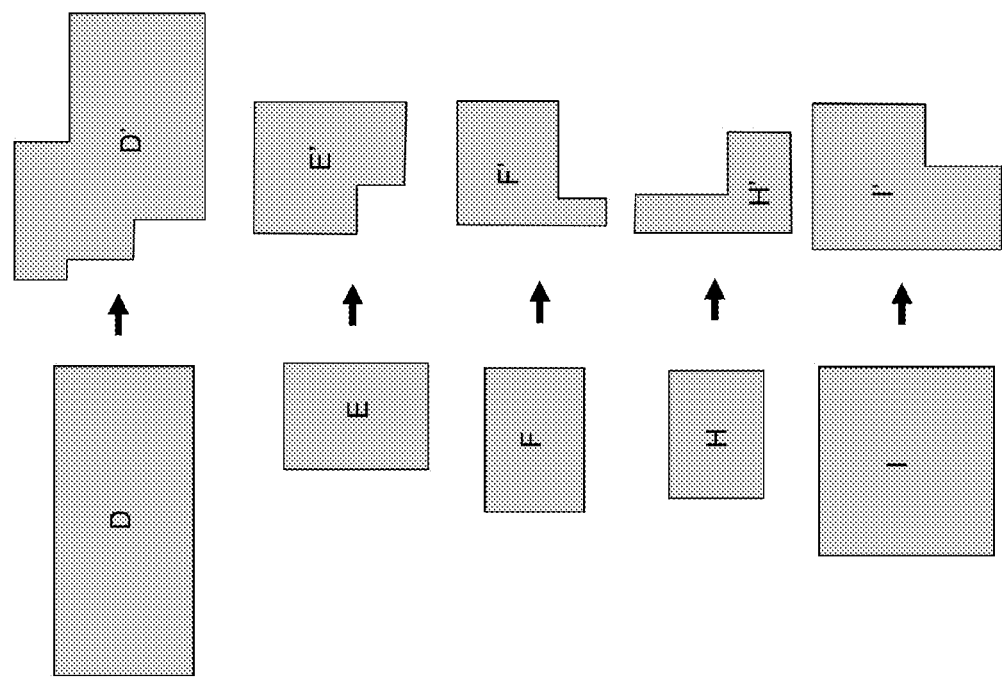
Figure 8F

Figure 8H
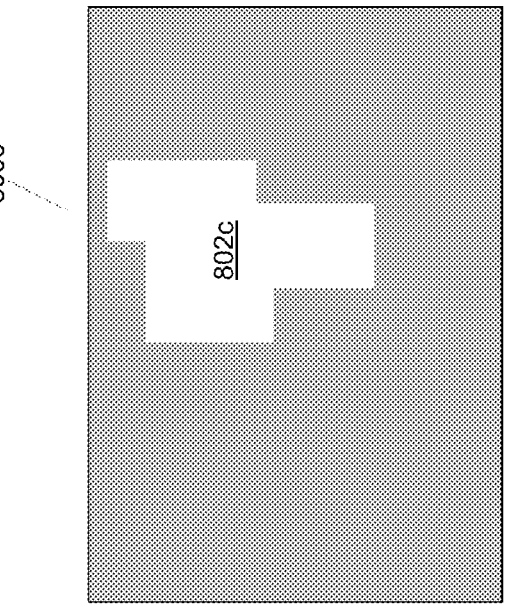
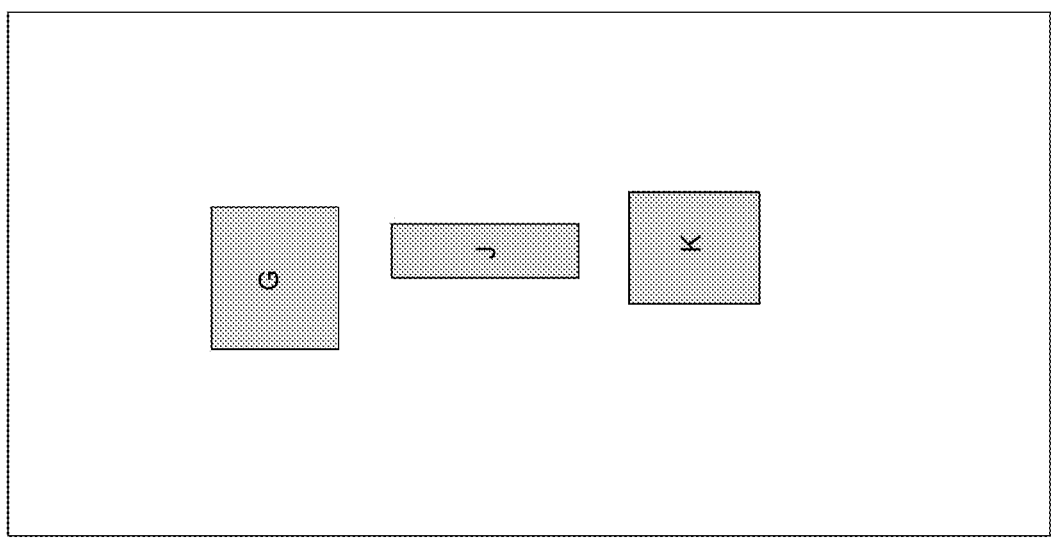

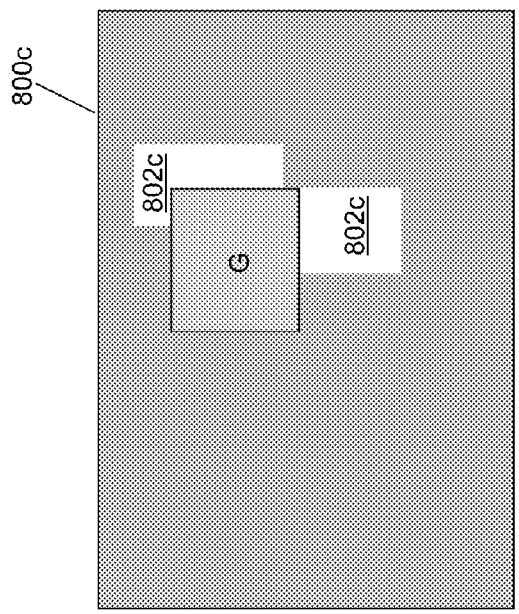
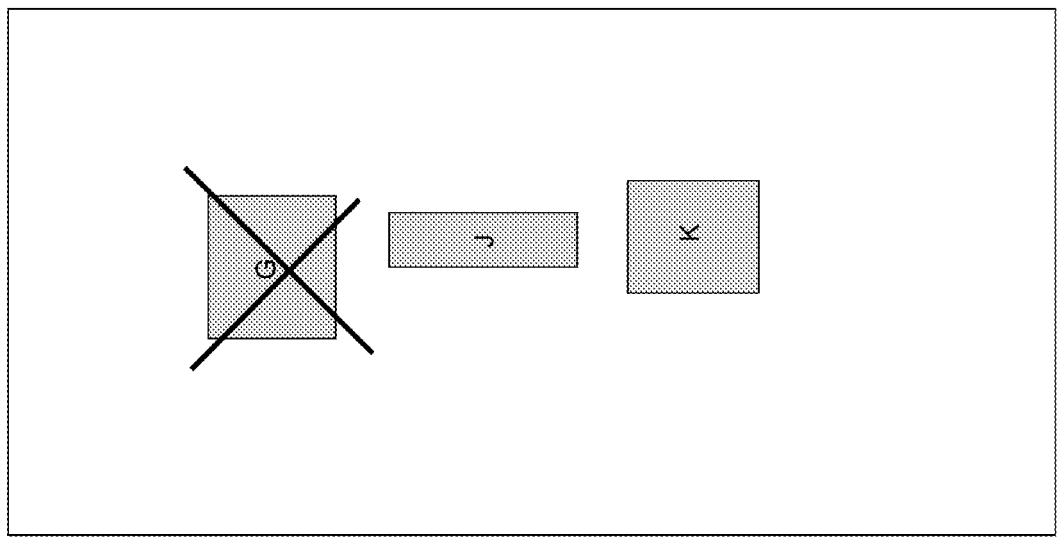
Figure 8I

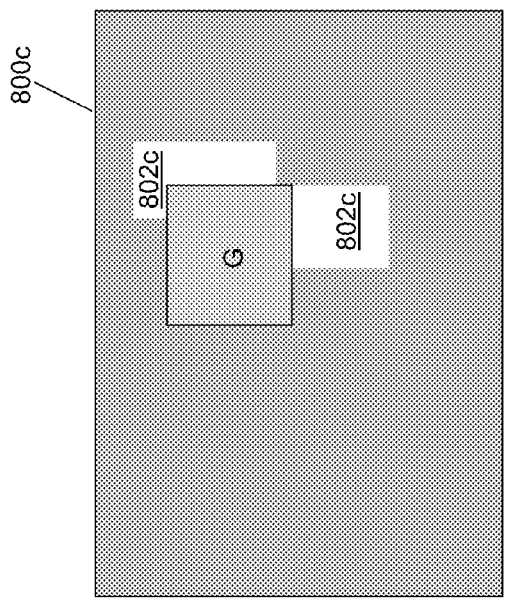
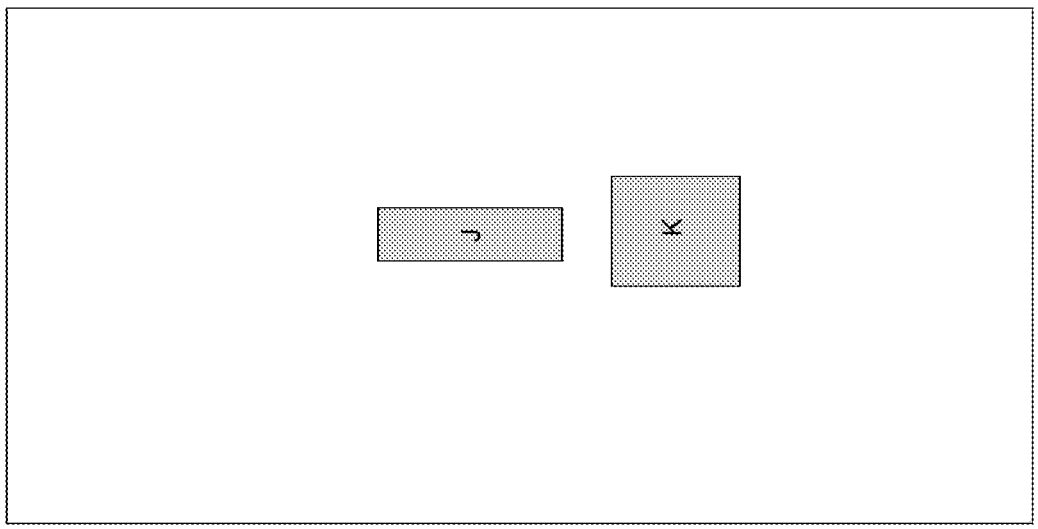
Figure 8J

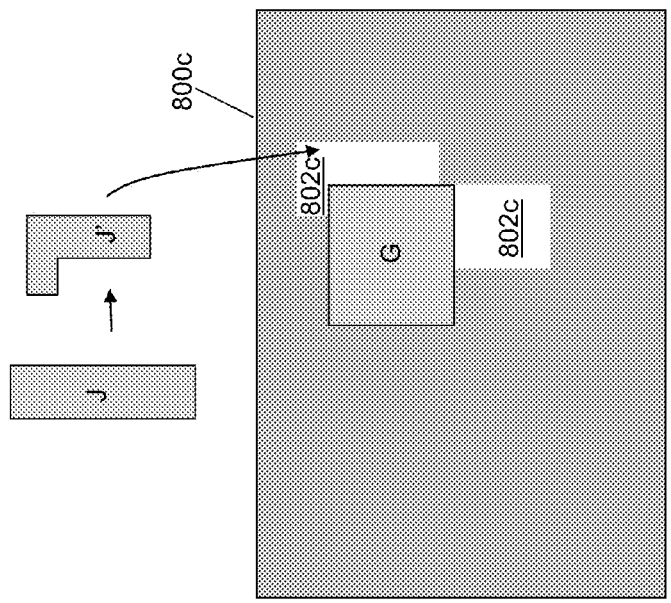
Figure 8K
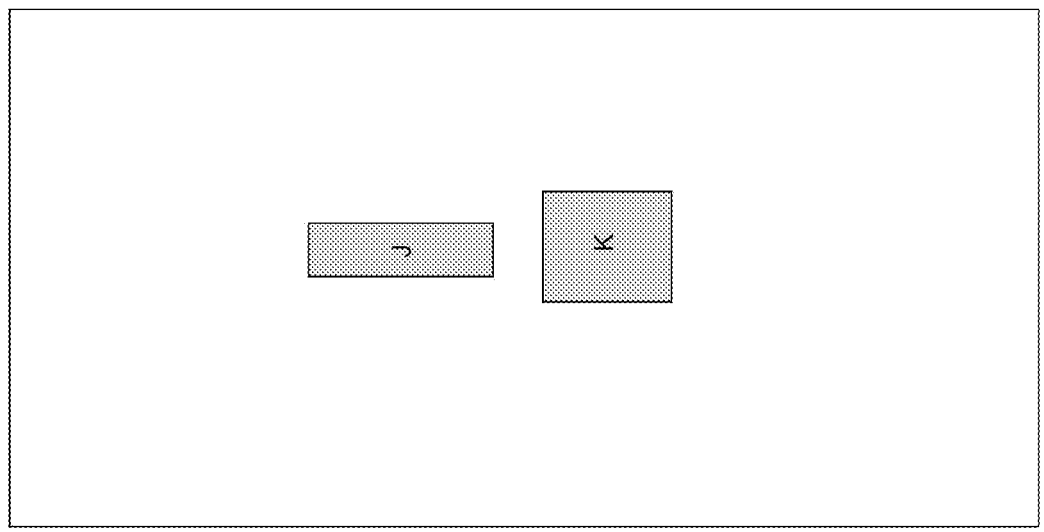

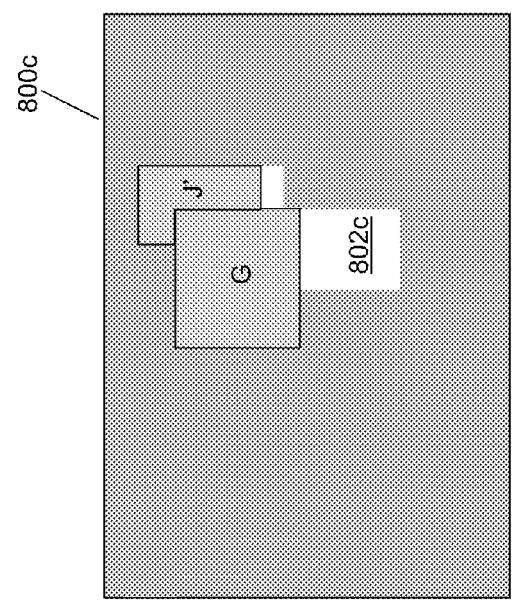
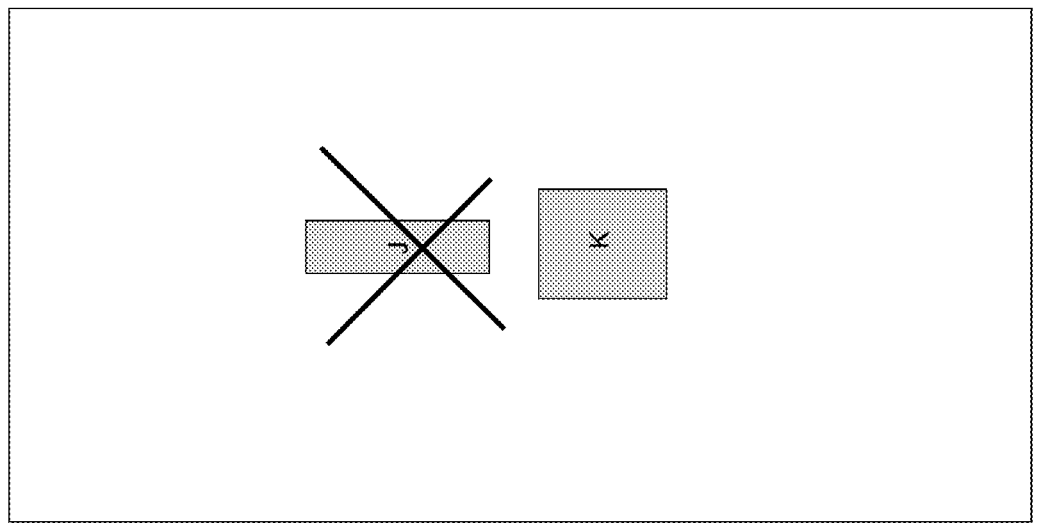
Figure 8L

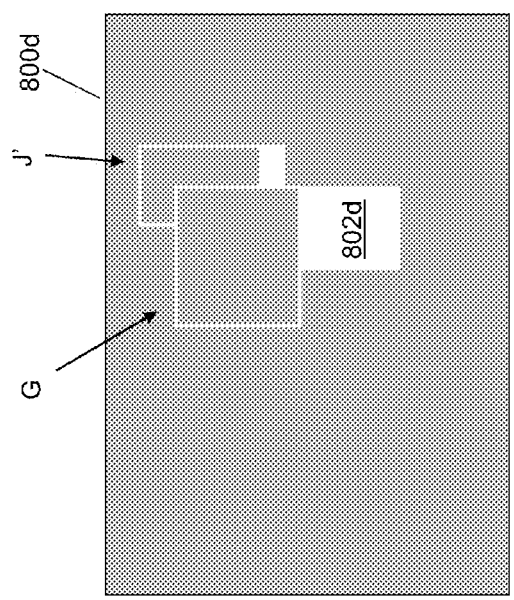
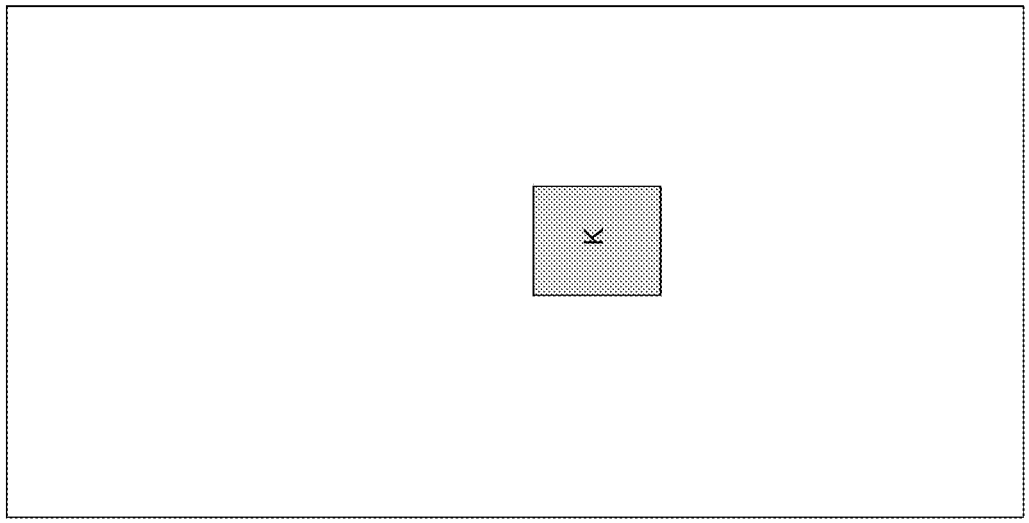
Figure 8M

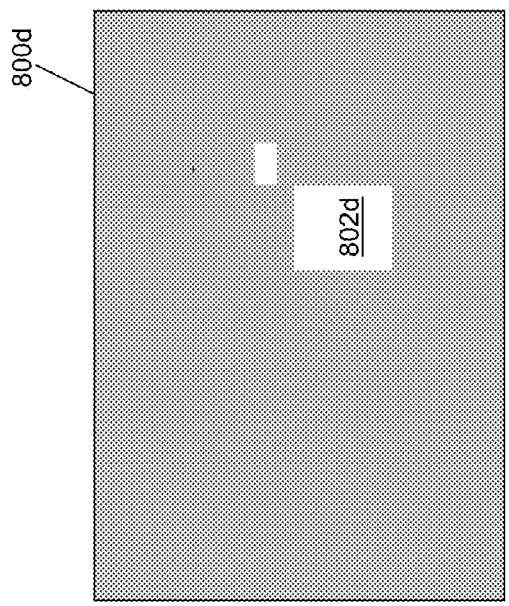
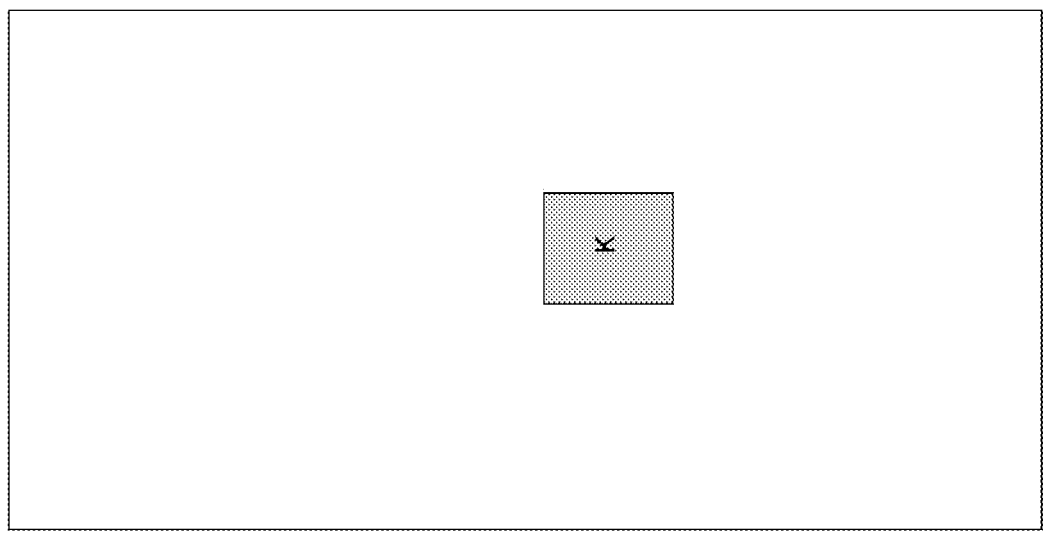
Figure 8N

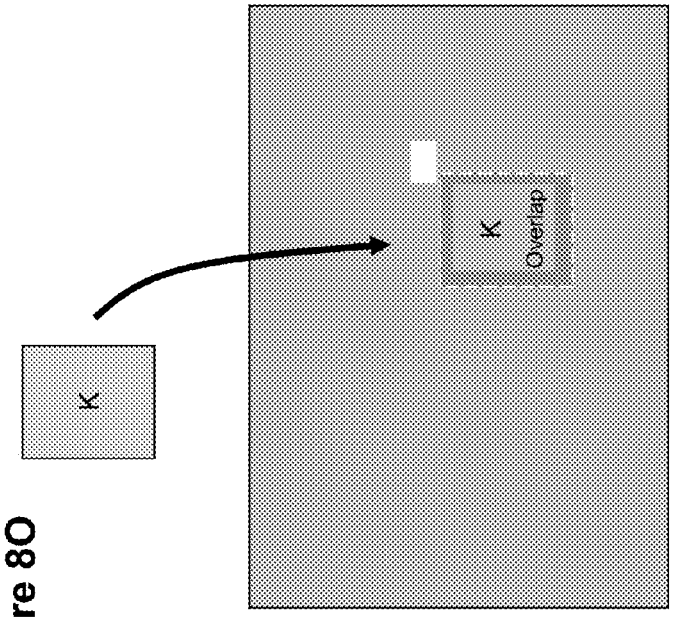
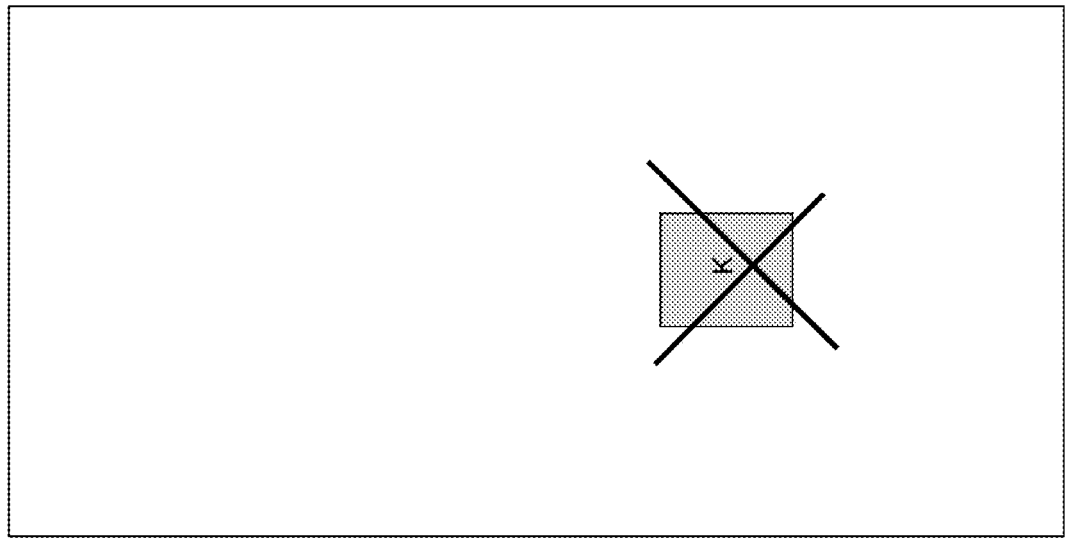
Figure 8O

METHOD AND SYSTEM FOR IMPLEMENTING CORE PLACEMENT

BACKGROUND

The invention is directed to an improved approach for placing core content for electronic designs.

A semiconductor integrated circuit (IC) has a large number of electronic components, such as transistors, logic gates, diodes, wires, etc., that are fabricated by forming layers of different materials and of different geometric shapes on various regions of a silicon wafer.

Many phases of physical design may be performed with computer aided design (CAD) tools or electronic design automation (EDA) systems. To design an integrated circuit, a designer first creates high level behavior descriptions of the IC device using a high-level hardware design language. An EDA system typically receives the high level behavior descriptions of the IC device and translates this high-level design language into netlists of various levels of abstraction using a computer synthesis process. A netlist describes interconnections of nodes and components on the chip and includes information of circuit primitives such as transistors and diodes, their sizes and interconnections, for example.

An integrated circuit designer may use a set of layout EDA application programs to create a physical integrated circuit design layout from a logical circuit design. The layout EDA application uses geometric shapes of different materials to create the various electrical components on an integrated circuit and to represent electronic and circuit IC components as geometric objects with varying shapes and sizes. After an integrated circuit designer has created an initial integrated circuit layout, the integrated circuit designer then verifies and optimizes the integrated circuit layout using a set of EDA testing and analysis tools. Verification may include, for example, design rule checking to verify compliance with rules established for various IC parameters.

The EDA tools may also be used to perform early stage analysis and examinations of an electronic design. For example, the process of performing chip planning can be greatly facilitated if the designer or chip planning tool can predict the expected die size and configuration for the IC product. However, the die size and configuration of the IC product is significantly affected by the configuration of the I/O ring and cores needed to support the IC product. The I/O ring is a top-level component within which all I/O related logic is instantiated, and is usually positioned around the periphery of the IC chip. Typical components on the I/O ring include, for example, I/O cells, power and ground cells, boundary scan registers (BSRs), pin structures, and/or other glue-logic structures. The IC core typically resides within the boundaries of the I/O ring, with the core typically including the internal blocks and connectivity of the IC chip.

For planning purposes, it is very desirable for engineers and architects to be able to obtain and visually review accurate estimates of the I/O ring and IC core configuration for the final IC product. One reason this functionality is useful is because this type of visualization and estimation allows the engineer or architect to know the required die size for the product. For example, consider that the I/O ring creates the peripheral boundary of the IC chip, which means that the amount of space available for the IC core is greatly affected by the size of the I/O ring. Therefore, the size and dimensions of the die are also greatly affected by the required dimensions of the I/O ring and the IC core structures. The size of the die for the IC product must be large enough to hold the required I/O ring structures as well as the core structures. Clearly, the most efficient die size is the situation when the dimensions of the minimum I/O ring periphery creates enough interior space to exactly match the required space of the core. If the total size of the periphery for the I/O ring is greater than what is needed to implement the core, the design is said to be "I/O limited". A design is "core limited" if the core requires more space than the minimum periphery required to implement the I/O ring.

The general problem addressed by embodiments of the invention pertains to placement of core structures and objects within the core area that is defined by inner periphery of an I/O ring. An I/O ring design will normally include a number of I/O objects having different sizes and dimensions. Because of the differing sizes and dimensions for the I/O ring objects, the inner periphery of that I/O ring will contain a number of non-uniform surfaces. Those non-uniform surfaces will collectively create a very complex shape for the core area.

An example I/O ring design 760 is illustrated in FIG. 7. The I/O ring design 760 includes numerous types of I/Os 700, 702, 704, 706, 708, 710, 712, 716, 718, 720, 722, and 724, where each of the I/Os have differing shapes and sizes, resulting in a core area 762 that has non-uniform surfaces on all of its top, right, bottom, and left sides. The issue is that the designer needs to place the collection 770 of core objects A-K into that non-uniform core area 762. This becomes a very difficult problem given the complex nature and shape of the core area 762, along with the fact that the core objects A-K may includes different types of structures, such as hard IP objects/blocks that cannot be re-shaped.

A "full flat" approach can be taken in an attempt to solve this problem. The full flat approach uses a fully detailed netlist, which is flattened and where each of the design shapes are placed into a core area as a set of closely placed rectilinear polygons. The problem with this approach is that since it only works with the fully detailed netlist, it cannot be used to perform early stage design analysis. Moreover, this approach is very costly and expensive since it operates upon a very large number of objects for the core placement. In addition, this approach does not provide any certainty that shapes/blocks will end up together or at preferred locations in the core, even if the preferred proximities or locations are helpful to the design performance. For example, it is likely that fitment of certain objects into the core will require those objects to be formed into odd or elongated shapes that stretch across different portions of the core area.

Therefore, there is a need for an improved approach to implement placement of objects into a core area of an I/O ring design.

SUMMARY

Embodiments of the present invention provide an improved method, system, and computer program product for implementing placement of objects into a core area of an I/O ring design. According to some embodiments, a multi-pass approach is taken to place and shape core objects into the available core area formed by the inner surface of the I/O ring. The multi-pass approach permits very fast placement of the core objects, which still provides for an accurate estimation of the die size and configuration requirements for the electronic design. Moreover, the present approach allows core objects to be placed in a way that retains any preferred affinities for the objects to be located near other objects, e.g., near specific I/Os on the I/O ring.

Other additional objects, features, and advantages of the invention are described in the detailed description, figures, and claims.

BRIEF DESCRIPTION OF FIGURES

FIG. 7 illustrates an example core placement task.

DETAILED DESCRIPTION

Embodiments of the present invention provide an improved method, system, and computer program product for performing core placement when presented with an I/O ring design. According to some embodiments, a multi-pass approach is taken to place and shape core objects into the available core area formed by the inner surface of the I/O ring. The multi-pass approach permits very fast placement of the core objects, while still providing for an accurate estimation of the die size and configuration requirements for the electronic design. Moreover, the present approach allows core objects to be placed in a way that retains any preferred affinities for the objects to be located near other objects, e.g., near specific I/Os on the I/O ring.

Some embodiments of the invention perform core placement in a top-down approach, by abstracting out specific details of placement for individual cells within objects to be placed in the core area. Instead, the core objects are viewed as a malleable area of content that can be shaped to fit available portions of the core area, so long as the shaping of the objects do not violate required dimensional boundaries, such as the boundaries of hard IP blocks. Multiple passes of this type of abstracted placement and shaping of core objects are performed, as needed, to attain successful placement of the objects in the core. This is distinctly different from, and advantageous over, the "full flat" approach which essentially proceeds in a bottom-up manner to perform a detailed placement of individual cells in the design.

Figure 1:
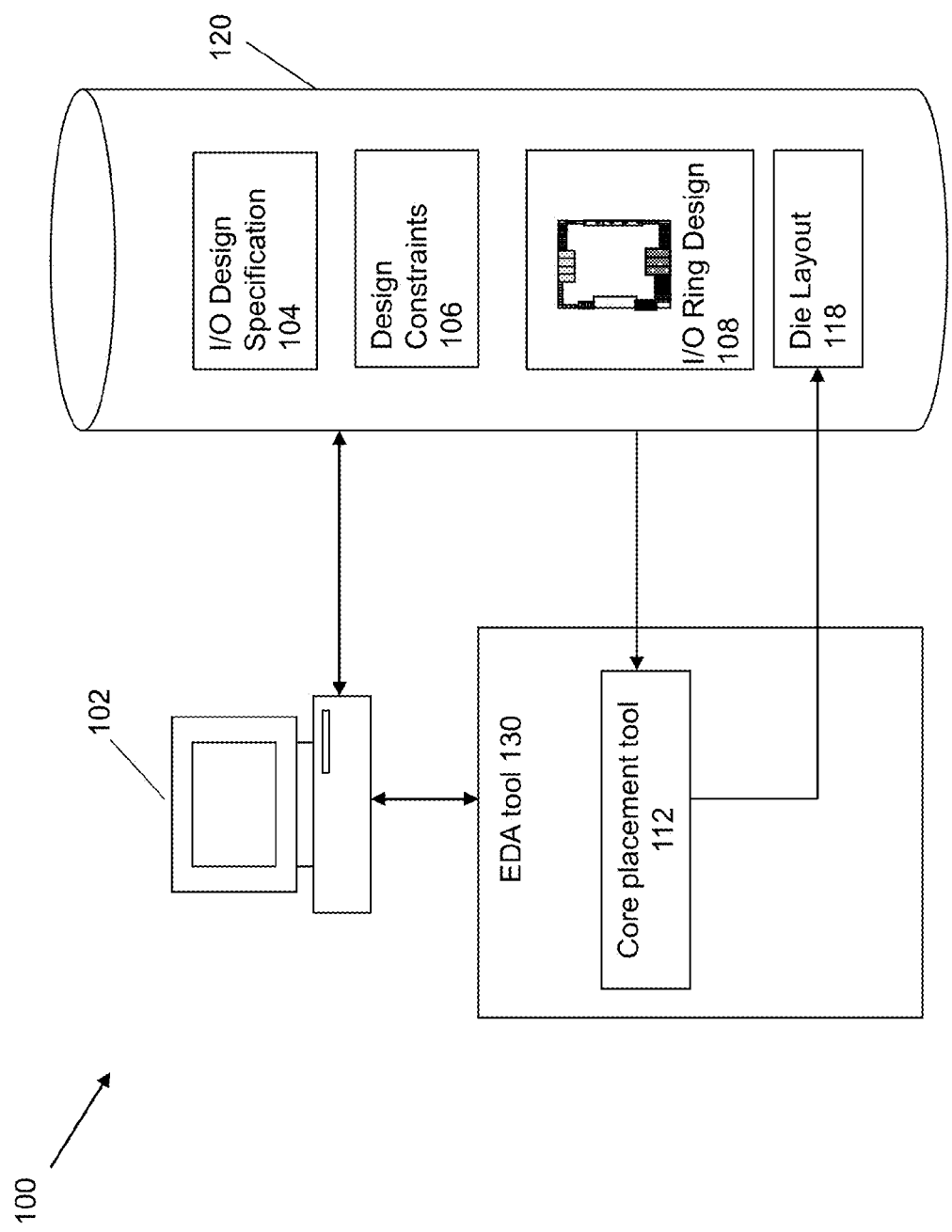
FIG. 1 illustrates an example system for performing core placement according to some embodiments of the invention.

FIG. 1 shows an architecture of a system 100 for performing core placement according to some embodiments of the invention. System 100 may include one or more users at one or more user stations 102 that operate the system 100 to design, edit, and/or plan die layouts for an electronic design. The users at user station 102 correspond to any individual, organization, or other entity that uses system 100 for planning or designing an electronic design. Such users include, for example, chip architects, product designers, design engineers, and/or verification engineers. User station 102 comprises any type of computing station that may be used to operate, interface with, or implement EDA tools, applications or devices 130. Examples of such user stations 102 include for example, workstations, personal computers, or remote computing terminals. User station 102 comprises a display device, such as a display monitor, for displaying electronic design layouts and processing results to users at the user station 102. User station 102 also comprises one or more input devices for the user to provide operational control over the activities of system 100, such as a mouse or keyboard to manipulate a pointing object in a graphical user interface.

The user station 102 may be associated with one or more computer readable mediums or storage devices 120 that hold data regarding the die layout 118, I/O ring design 108, design specifications 104 and/or constraints 106 relating to the proposed electronic design. Computer readable storage device 120 comprises any combination of hardware and software that allows for ready access to the data that is located at the computer readable storage device 120. For example, computer readable storage device 120 could be implemented as computer memory operatively managed by an operating system. The computer readable storage device 120 could also be implemented as an electronic database system having storage on persistent and/or non-persistent storage.

The one or more design specifications 104 comprise any set of information or parameters that the user has developed for information relating to the electronic design or die design 118. The specification 104 includes the list of components that should be included within the I/O ring, such as I/O cells, power and ground cells, boundary scan registers (BSRs), pin structures, and/or other glue-logic structures. The specification also includes information about the IC cores, such as soft IP, hard IP, and cells.

One or more design constraints 106 may also be stored in database 120. The design constraints comprise additional specifications for the I/O ring and/or IC core that control the allowable configurations for the die design 118.

In operation, the user at user station 102 provides a core placement tool 112 of an EDA tool 130 with an I/O ring design 108, along with the design specification 104 and design constraints 106. The core placement tool 112 will use the specification 104 and design constraints 106 to generate a die layout 118 where core objects are placed within the core area defined by the I/O ring design 108. The core placement tool 112 implements a multi-pass top-down approach for pacing the core objects in the I/O ring 108.

The successful placement of core objects in the die layout 118 allows the user to visualize and perform analysis upon the die layout 108. For example, for chip planning purposes, die size estimation can be performed once the die layout 108 has been generated. In addition to chip planning, the die layout 108 can be used for prototyping purposes. Moreover, the die layout 108 can be passed to downstream design tools to help construct the actual layout for the IC product. Analysis results may be stored in the compute readable storage medium 120 or displayed on a display device at user station 102.

Figure 2:
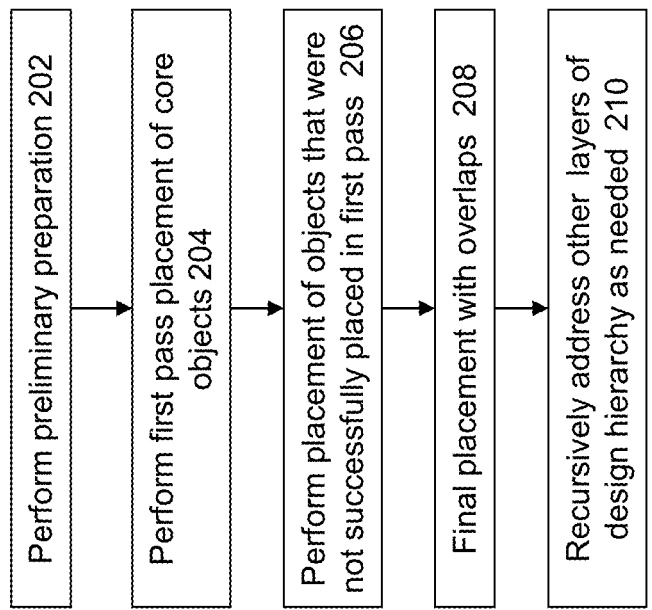
FIG. 2 illustrates a flowchart of an approach for performing core placement according to some embodiments of the invention.

FIG. 2 shows a flowchart of an approach for performing core placement according to some embodiments of the invention. At 202, preliminary preparations are performed to set up the environment for performing the core placement. This action receives the input design data and populates any necessary data structures that are used in the following passes of the core placement mechanism.

At 204, a first pass placement is performed of core objects into the core area of the I/O ring design. This action attempts to place the core objects into the core area using an approach that will substantially place most of the core objects, but which may leave one or more unplaced objects. This is because this level of placement is being performed without requiring an absolutely exhaustive search of the entire search space to fit the core objects into the core area. Instead, the idea is that a coarser granularity search at this stage will allow the substantial majority of the objects to be placed without incurring excessive costs in terms of time or computing requirements.

This type of coarse-grained search may be implemented by setting limits and/or thresholds upon the search space for placing the core objects, e.g., by setting a maximum number of attempts to successfully place each object before deciding to move to the next object to be placed. This action may also be performed by precluding certain types of shape manipulations at this stage, e.g., to only allow shape manipulations that preserve the rectilinear shape of the objects (such as aspect ratio changes) while precluding shape adjustments that would create a non-rectilinear shape.

At 206, a second pass placement is performed to attempt to place objects that were not successfully placed in the first pass. By this stage, it is assumed that the vast majority of the core objects have already been successfully placed. Therefore, it is no longer too expensive at this stage to expend the resources to perform a finer granularity search of the search space to fit the remaining objects into the available core area. For example, a more exhaustive algorithm may be utilized at this point to attempt to place the remaining core objects. In addition, the shapes of the objects may be manipulated as non-rectilinear shapes, if possible or necessary, to fit into the available core area space.

At 208, a final placement pass may be performed to place any objects that were otherwise not placed in the previous passes. This action may be taken, for example, to permit placements that result in an overlap with neighboring objects. While a layout having such overlaps may not be necessarily permissible in a final layout design, such overlaps may be permissible for early stage design analysis, subject to conditions that may be established for the permissible overlaps by the designer or the design tool.

The electronic design is likely to have multiple hierarchal levels. At 210, the approach may be recursively applied to address other levels of the design hierarchy.

Figure 3:
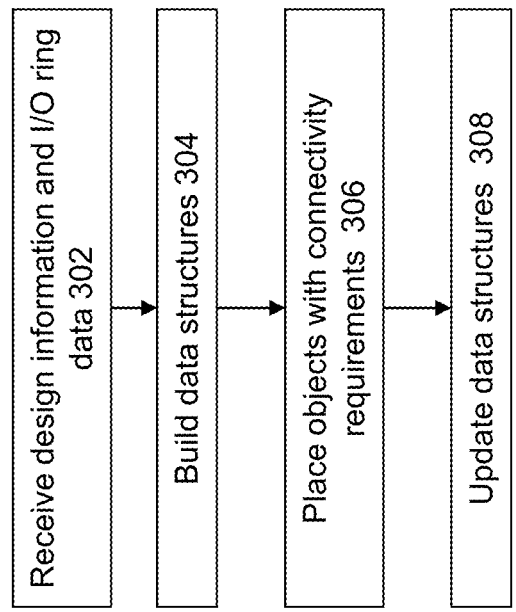
FIG. 3 illustrates a flow of an approach for performing preliminary preparation for core placement according to some embodiments of the invention.

FIG. 3 shows a more detailed flowchart of an approach for implementing an interface for visualizing and controlling candidate die arrangements. At 302, information is received that is utilized by the core placement mechanism to perform core placement. Such information includes, for example, the specification/configuration information for the electronic design and the I/O ring design. The specification/configuration information includes any set of information or parameters that the user has developed for information relating to the electronic design or die design. The specification/configuration information includes, for example, information about the IC cores that need to be placed, such as the soft IP, hard IP, and cells. The I/O ring design information provides information about the configuration of the I/O ring.

At 304, any data structures that need to be utilized for the core placement process are set up and populated. This action sets up the data regarding the I/O ring and its corresponding physical boundaries. The physical hierarchy is also prepared, including identification of soft blocks and hard IP blocks that need to be placed. It is noted that the hierarchy may include objects to be placed at multiple levels of the hierarchy. For example, assume that a B* tree approach is taken to perform core placement. The B* tree data structure would be populated with any necessary design information, e.g., information about the hierarchy of objects to be placed as well as any required dimensional/geometric parameters.

At 306, an initial placement can be made of any objects with specific connectivity or proximity requirements. For example, a designer may identify certain blocks that need to be located near certain of the I/O cells in the I/O ring. This preference may implemented, for example, by assigning weights or weighting schemes to provide an affinity for the associated objects to certain other objects (e.g., I/O cells) or locations in the core area.

Prioritization may thus occur to pre-place certain of the core objects. This works by taking all of the objects that need to be placed into the core area, and to sort the objects by priority. The objects that need to be placed at specific locations would be weighted to have a higher priority relative to other objects. The highest priority objects would therefore get placed first. Objects formed of soft IP could be malleably placed into the core area. Items having hard IP blocks would be limited in its shape malleability by the outline of the hard IP block.

After the initial placement, at 308, the placement data structures would be updated to replace the initial placements. For example, the pre-placed blocks now appear as obstructions to the rest of the placement process. Therefore, the available core area is now reduced by the area occupied by the newly placed objects.

Figure 4:
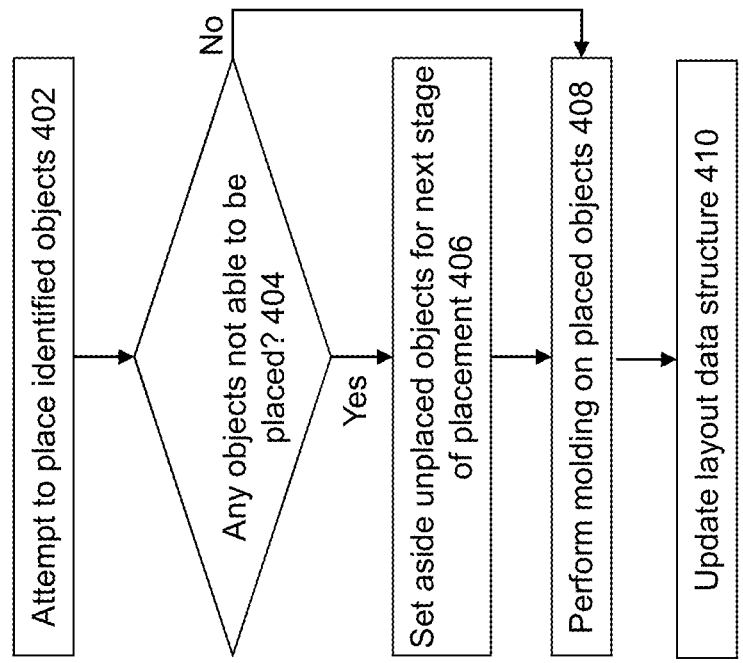
FIG. 4 illustrates a flow of an approach for performing a first pass placement according to some embodiments of the invention.

Once the preliminary preparations have been performed, the first pass placement activities are then conducted. FIG. 4 shows a flowchart of a first pass placement approach according to some embodiments of the invention. At 402, an attempt is made to place the core objects. In some embodiments, a B* tree is utilized to perform the core placement, in which as much of the top level hierarchy is placed as possible. The objects to be placed are analyzed and checked for placement constraints, e.g., the presence of hard IP blocks.

Transformations are performed to graph the object fitment and to see if the object can be legally placed into the core area. Simulated annealing can be implemented perform placement of the objects. A heuristic can be employed to change the aspect ratio of the object obtain better packing of the object into the available core area. For example, a set of pre-determined aspect ratios (e.g., 1:1, 1:2, 1:4, etc.) may be employed to try fitting the object into the available space.

The transformations may be performed (e.g., on a random basis) for a given number of attempts. A threshold may be established for the number of attempts that can be taken in the first pass to place an object. A determination is made at 404 whether there are any objects that cannot be placed in 402. Any object that cannot be legally placed within the threshold number of attempts would, at 406, be set aside for the next pass of the placement algorithm. For the objects that are legally placed, "molding" can be performed at 408 to perform defragmentation, where objects are shaped to "squash" against other shapes to create larger portions of contiguous free space in the core area. The layout data is updated at 410 to reflect the results of the placements made in the first pass.

Once the first pass placement activities have been completed, most of the core objects should have been placed. At this point, there may be some additional core objects that remain which were not successfully placed in the first pass. The second pass placement procedure can be performed to attempt to place these remaining objects.

Figure 5:
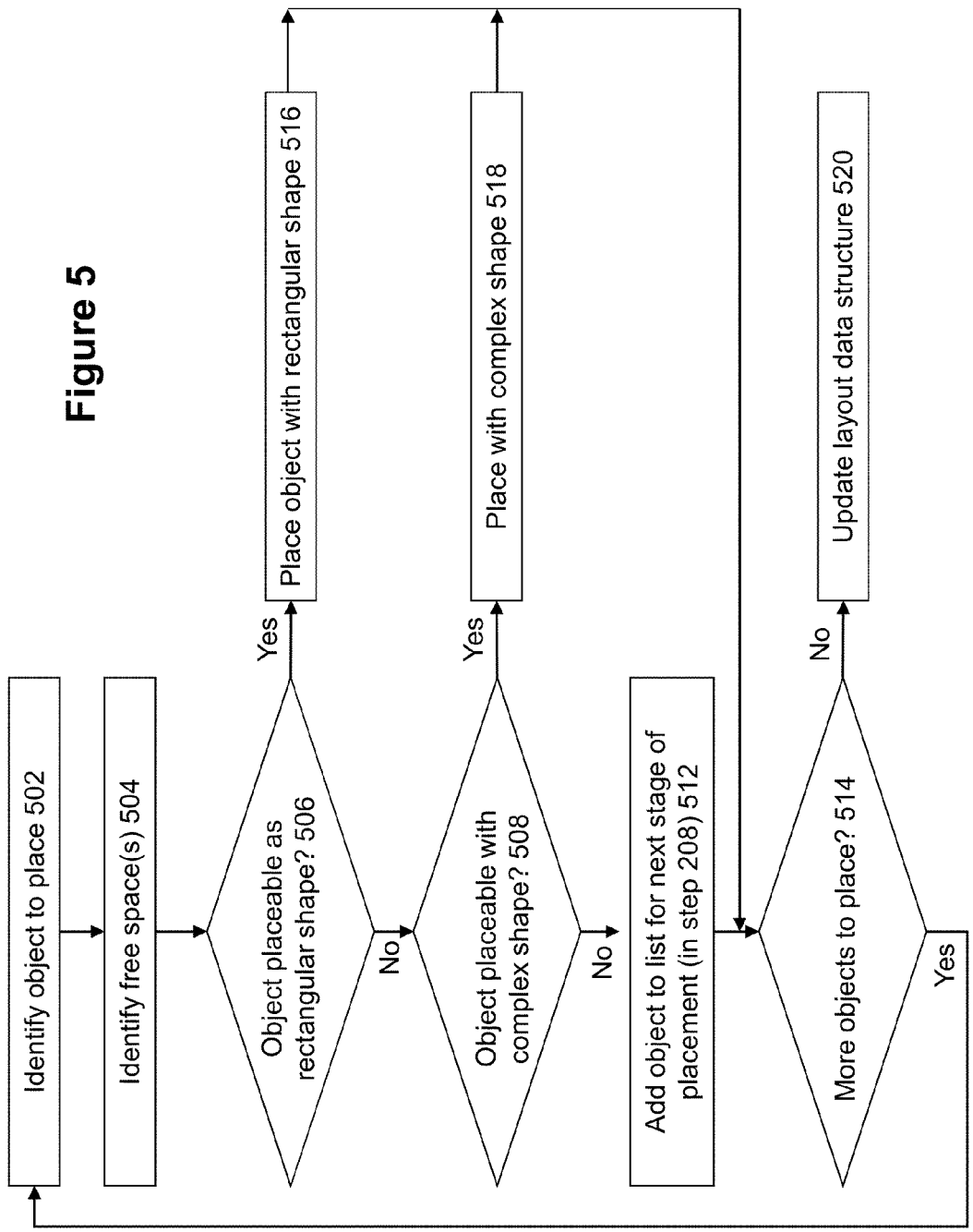
FIG. 5 illustrates a flow of an approach for performing a follow-up pass for core placement according to some embodiments of the invention.

FIG. 5 shows a flowchart of a second pass placement approach according to some embodiments of the invention. At this point, there is a list of one or more objects to be placed. At 502, identification is made of an object that needs to be placed at this stage. This action is performed by taking an object one-by-one from the list to perform placement of that object.

At 504, the available free space in the core area is checked to see if there is sufficient free space to fit the identified object.

A determination is made at 506 whether the object can be placed in the free space with a rectangular shape. The rectangular shape may be subject to various aspect ratio changes. If the free space is sufficient to hold the object as a rectangular, then at 516, the object is placed with the rectangular shape.

If the object cannot be legally placed as a rectangular shape, then at 508, a further determination is made whether the object can be placed as a more complex shape. A check is performed to see if there is a contiguous portion of free space that is large enough to hold the area of the object, if the object is modified to be non-rectangular in shape. The distinction of this action and the previous action is that the previous action essentially looks at the shape to see if its fits into the free space. This current action now looks at the free space to see if it can fit the area of the shape. If so, then at 518, the object is placed with the required complex shape.

If the object cannot be legally placed, then at 512, it is added to the list of objects that is to be addressed in the next stage of the placement process. A determination is made at 514 whether there are any additional objects to place. If so, then the process returns back to 502 to address the additional object(s). If there are no further objects to place at this stage, then at 520, the layout data is updated to reflect the results of the placements made in the second pass. Like the first pass, the second pass may also include a molding action to perform defragmentation, where the placed objects are shaped to fit against other shapes to create larger portions of contiguous free space in the core area.

Once the second pass placement activities have been completed, there should be either zero or very few core objects that remain for placement which were not successfully placed in the previous passes. At this point, a final pass placement procedure can be performed to attempt to place these remaining objects.

Figure 6:
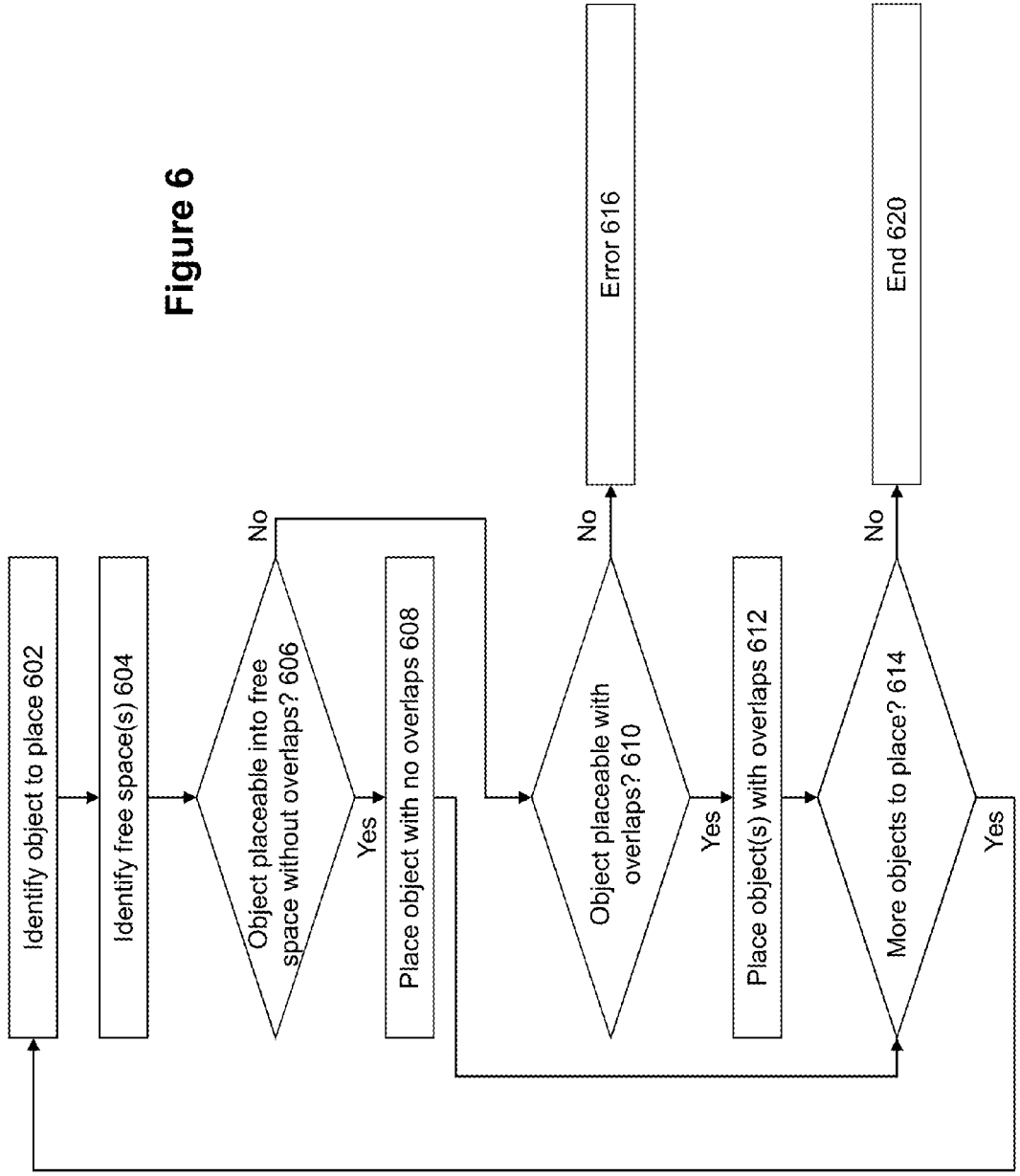
FIG. 6 illustrates a flow of an approach for performing a final placement with overlaps according to some embodiments of the invention.

FIG. 6 shows a flowchart of a final pass placement approach according to some embodiments of the invention. At this point, there may be a list of one or more objects to be placed. At 602, identification is made of an object that needs to be placed at this stage. This action is performed by taking an object from the list to perform placement of that object. At 604, the available free space in the core area is checked.

A determination is made at 606 whether the object can be placed in the available free space without resulting in any overlaps. If so, then at 608, the object is placed into the free space without overlaps. If not, then a determination is made at 610 whether the object is placeable with overlaps. For example, for early stage design analysis, the tool may be configured to allow placement of objects with overlaps under certain circumstances, e.g., if there is it is sufficient free space in other parts of the core area to correspond to the overlap area.

If the placement with overlap is permitted, then at 612, the object is placed with the overlap. Otherwise, at 616, an error condition has occurred that will need to be addressed, e.g., by expanding the size of the I/O ring to provide for additional core area.

A determination is made at 614 whether there are any additional objects to process. If so, then the process returns to 602 to process the additional object(s). If not, then the core placement process ends at 620.

This disclosure will now provide an illustrative example of how the multi-pass approach can be taken to perform core placement. An example I/O ring design 760 is illustrated in FIG. 7. The I/O ring design 760 includes numerous types of I/Os 700, 702, 704, 706, 708, 710, 712, 716, 718, 720, 722, and 724, where each of the I/Os have differing shapes and sizes, resulting in a core area 762 that has non-uniform surfaces on all of its top, right, bottom, and left sides. As previously noted, the issue is that the designer needs to place the collection 770 of core objects A-K into that non-uniform core area 762. For conventional placement systems, this becomes a very difficult problem given the complex nature and shape of the core area 762, along with the fact that the core objects A-K may includes different types of structures, such as hard IP objects/blocks that cannot be re-shaped. However, embodiments of the invention can be applied to very efficiently place the core objects A-K into the free core area 762.

FIGS. 8A-O illustrate how some embodiments of the invention may be applied to place the core objects A-K into the free core area 762. FIG. 8A illustrates a version of the I/O ring 760 that has been abstracted to represented the initial blockage areas 800a formed by the I/O cells on the I/O ring 760. The initial free space 802a is shown for the core area that is available to be used to place the core objects. The list of objects A-K to place in free space 802a is shown on the left side of the figure.

Assume that core objects A, B, and C are objects that have been identified as requiring pre-placement so that these objects are to be located near specific I/O cells on the I/O ring 760. FIG. 8B illustrates the example results for performing pre-placement of these objects A, B, and C in specific locations within the free area 802a along designated portions the I/O ring 760. In particular, object A is placed on the lower left side, object B is placed on the upper right side, and object C is placed on the lower right side of the free space 802a. Since these objects A, B, and C have been placed, they can be removed from the list of objects on the left side box (which represents the list of objects that still need to be placed).

Figure 8C:
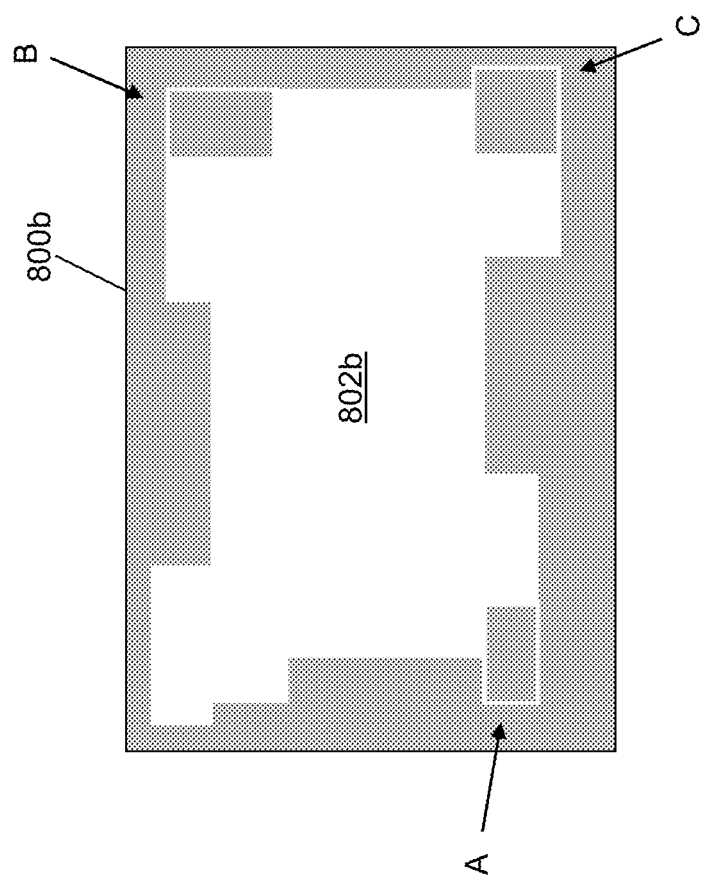
FIGS. 8A-O provide an illustrative example of core placement according to some embodiments of the invention.

FIG. 8C shows the updated blockage area 800b formed by the original blockage area 800a combined with the addition of the objects A, B, and C that have now been placed. The updated free space 802b is now reduced, where the previous free space 802a is reduced by locations of the placement of the objects A, B, and C.

FIG. 8D reproduces the updated blockage area 800b and the updated free space 802b on the right side of the figure. The left side of the figure shows the list of remaining objects D-I that needs to be placed into the free space 802b.

The first pass placement action can now be taken to attempt to place the list of objects D-I into the free space 802b. An attempt is made in the first pass to place each object D-I into the free space 802b.

Assume that objects D, E, F, H, and I can legally be placed into the free space 802b as rectangular shapes. Further assume that objects G, J, and K cannot legally be placed into the free space 802b at this time. This situation is illustrated in FIG. 8E. In particular, objects D, E, F, H, and I have been inserted into the free space 802b at various locations. Since these objects D, E, F, H, and I have been placed, they can be removed from the list of objects on the left side box.

Next, molding can be performed to press and shape the placed objects top adjust to contours of the I/O ring surface, to reduce fragmentation of the free space. FIG. 8F shows an example result of molding each of the placed objects D, E, F, H, and I into revised shapes D', E', F', H', and I', respectively. This creates a larger contiguous portion of free space in the core area.

Figure 8G:
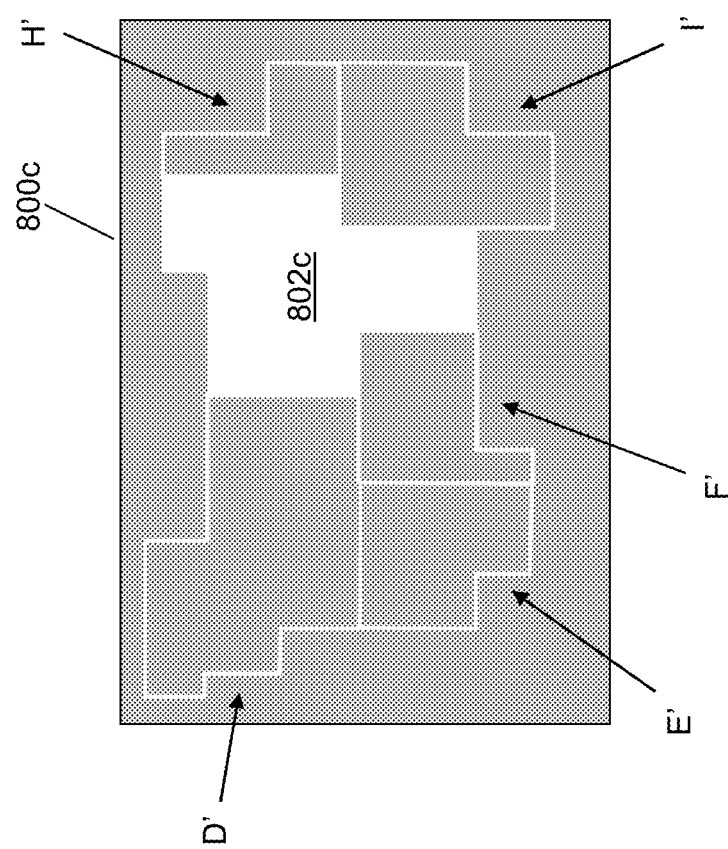

FIG. 8G shows the updated blockage area 800c formed by the previous blockage area 800b combined with the addition of the objects D, E, F, H, and I that have now been placed. The updated free space 802c is now reduced, where the previous free space 802b is reduced by locations of the placement of the objects D, E, F, H, and I.

FIG. 8H reproduces the updated blockage area 800c and the updated free space 802c on the right side of the figure. The left side of the figure shows the list of remaining objects G, J, and K that needs to be placed into the free space 802c.

The second pass placement action can now be taken to attempt to place the list of objects G, J, and K into the free space 802c. An attempt is made in the second pass to place each object G, J, and K into the free space 802c, whether as rectangular shapes or as more complex shapes.

First, an attempt is made to place object G. Assume that object G can be legally placed into the free space 802c as a rectangular shape. This situation is illustrated in FIG. 8I. In particular, object G has been successfully inserted into the free space 802c. Since object G has been successfully placed, it can be removed from the list of objects on the left side box. The left side of the FIG. 8J shows the list of remaining objects J and K that needs to be placed.

An attempt is now made to place object J. Assume that object J cannot be legally placed into the free space 802c as a rectangular shape. A further attempt is made to see if object J can be placed as a complex shape. Assume that object J can be legally placed into the free space 802c as a complex shape, e.g., there is sufficient contiguous area in free space 802c and there are no hard IPs in object J that would preclude the required complex shape. FIG. 8K illustrates that object J can be re-shaped into complex shape J' for placement into free space 802c. FIG. 8L shows the result of placing shape J' into the free space 802c. Since object J has been successfully placed, it can be removed from the list of objects on the left side box.

Next, an attempt is made to place object K. Assume that object K cannot be legally placed into the free space 802c as a rectangular shape. A further attempt is made to see if object K can be placed as a complex shape. Further assume that object K cannot be legally placed into the free space 802c as a complex shape.

At this point, the second pass has now ended with only objects G and J' being placed. FIG. 8M shows the updated blockage area 800d formed by the previous blockage area 800d combined with the addition of the objects G and J that have now been placed. The updated free space 802d is now reduced, where the previous free space 802c is reduced by locations of the placement of the objects G and J. While not shown in this figure, molding may be performed at this point to create a larger contiguous portion of free space.

FIG. 8N reproduces the updated blockage area 800d and the updated free space 802d on the right side of the figure. The left side of the figure shows the list of the remaining object K that needs to be placed into the free space 802d.

The final pass placement action can now be taken to attempt to place the object K into the free space 802d. An attempt is made in this final pass to place object K without overlaps. Assume that it is not possible to place object K without overlaps. A further attempt is made to place object K with overlaps. Further assume that it is possible to place object K in this manner. This situation is illustrated in FIG. 8O. In particular, object K has been successfully inserted into the free space 802d, even though there are overlaps with the surrounding blockages. Since object K has been successfully placed, it can be removed from the list of objects on the left side box. At this point, all of the core objects have now been placed.

Therefore, what has been described is an improved method, system, and computer program product for performing core placement when presented with an I/O ring design. The multi-pass approach of the present embodiment provides a very efficient way to place objects into the core of a die layout, since objects are handled on an abstract manner to permit very quick placement of the objects into the space defined by the I/O ring. In particular, the different passes can be configured to provide different levels of placement speed and efficiencies, which taken overall, facilitates the core placement results which are both fast to achieve and still very accurate. Moreover, the present approach allows core objects to be placed in a way that retains any preferred affinities for the objects to be located near other objects, e.g., near specific I/Os on the I/O ring.

System Architecture Overview

Figure 9:
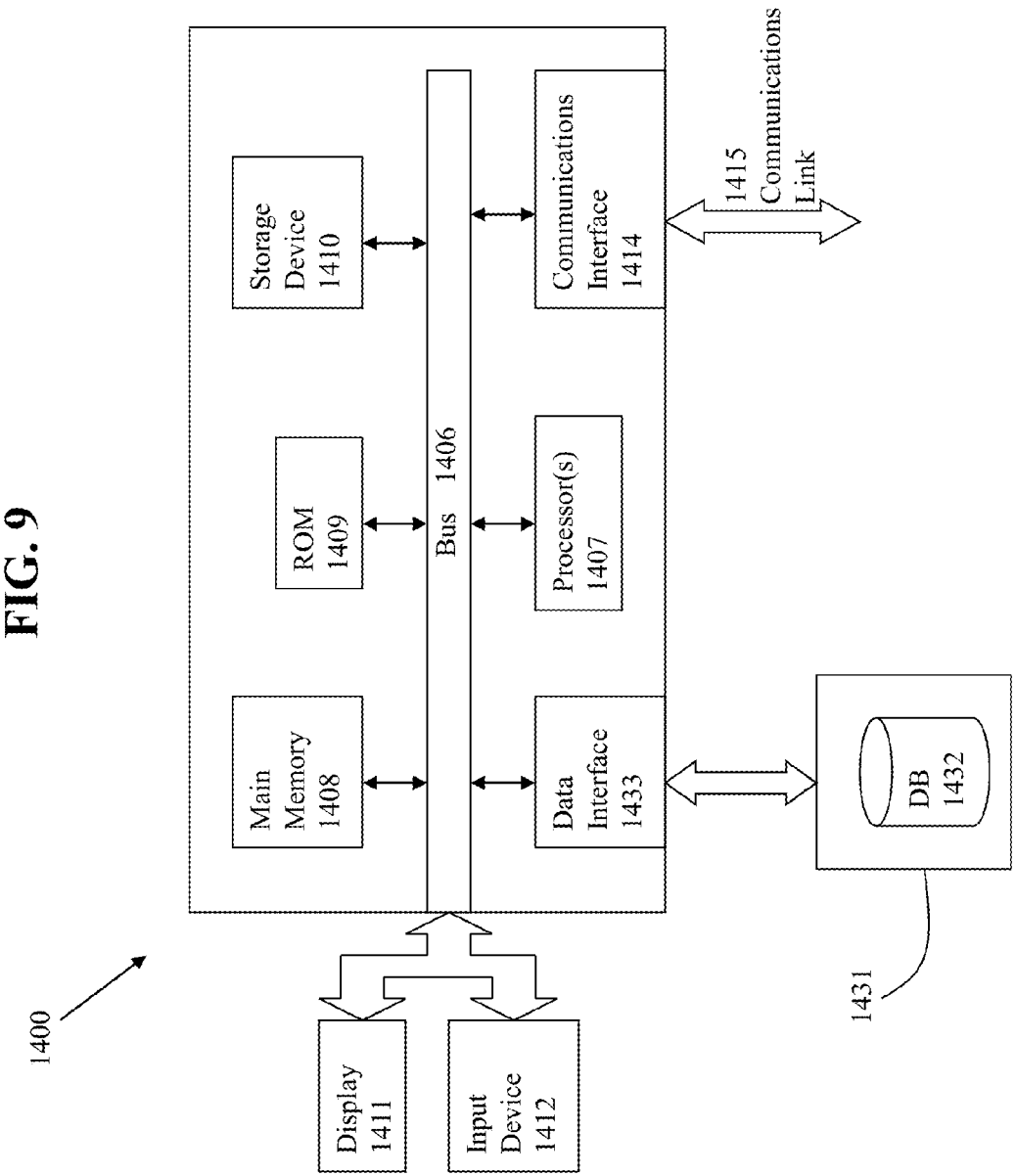
FIG. 9 shows an architecture of an example computing system with which the invention may be implemented.

FIG. 9 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer-implemented method implemented with a processor for performing core placement for an electronic product, comprising:
    using at least one processor to perform a process, the process comprising:
    performing a first pass placement of at least some of core objects into a core area, where
        the core area is surrounded by an I/O ring that includes one or more pin structures, and
        the first pass placement corresponds to at least one limiting condition for placing the core objects; and
    performing a second pass placement for one or more remaining core objects of the core objects, in which the second pass placement permits complex shape placement for the one or more remaining core objects of the core objects.

2. The method of claim 1 in which the least one limiting condition for placing the core objects in the first pass placement comprises a limiting threshold number of attempts to place an object.

3. The method of claim 1 in which the least one limiting condition for placing the core objects in the first pass placement comprises a prohibition on placing a non-rectilinear shape.

4. The method of claim 1 in which molding is performed to create more contiguous free space in the core area.

5. The method of claim 1 in which a B* tree approach is employed to place the core objects.

6. The method of claim 1 further comprising performing preliminary placement of the core objects.

7. The method of claim 6 in which the preliminary placement is performed for objects having location or proximity preferences.

8. The method of claim 1 in which the core objects are sorted for placement.

9. The method of claim 1 further comprising recursive placement for different hierarchical levels of design elements in the electronic product.

10. The method of claim 1 in which the core objects may be subject to aspect ratio changes for placement.

11. The method of claim 1 further comprising:
    performing a third pass placement in which the third pass placement permits shape overlaps for the core objects.

12. A computer program product embodied on a non-transitory computer usable medium, the non-transitory computer readable medium having stored thereon a sequence of instructions which, when executed by a processor causes the processor to execute a method performing core placement for an electronic product, the method comprising:
    performing a first pass placement of at least some of core objects into a core area, where
        the core area is surrounded by an I/O ring that includes one or more pin structures, and
        the first pass placement corresponds to at least one limiting condition for placing the core objects; and
    performing a second pass placement for one or more remaining core objects of the core objects, in which the second pass placement permits complex shape placement for the one or more remaining core objects of the core objects.

13. The computer program product of claim 12 in which the least one limiting condition for placing the core objects in the first pass placement comprises a limiting threshold number of attempts to place an object.

14. The computer program product of claim 12 in which the least one limiting condition for placing the core objects in the first pass placement comprises a prohibition on placing a non-rectilinear shape.

15. The computer program product of claim 12 in which molding is performed to create more contiguous free space in the core area.

16. The computer program product of claim 12 in which a B* tree approach is employed to place the core objects.

17. The computer program product of claim 12 further comprising performing preliminary placement of the core objects.

18. The computer program product of claim 17 in which the preliminary placement is performed for objects having location or proximity preferences.

19. The computer program product of claim 12 in which the core objects are sorted for placement.

20. The computer program product of claim 12 further comprising recursive placement for different hierarchical levels of design elements in the electronic product.

21. The computer program product of claim 12 in which the core objects may be subject to aspect ratio changes for placement.

22. The computer program product of claim 12 further comprising:
    performing a third pass placement in which the third pass placement permits shape overlaps for the core objects.

23. A system for performing core placement for an electronic product, comprising:
    a processor;
    a memory for holding programmable code, wherein
        the programmable code includes instructions which, when executed by the processor, cause the processor to:
        perform a first pass placement of at least some of core objects into a core area, where
            the core area is surrounded by an I/O ring that includes one or more pin structures in an I/O area, and
            the first pass placement corresponds to at least one limiting condition for placing the core objects; and
        perform a second pass placement for one or more remaining core objects of the core objects, in which the second pass placement permits complex shape placement for the one or more remaining core objects of the core objects.

24. The system of claim 23 in which the least one limiting condition for placing the core objects in the first pass placement comprises a limiting threshold number of attempts to place an object.

25. The system of claim 23 in which the least one limiting condition for placing the core objects in the first pass placement comprises a prohibition on placing a non-rectilinear shape.

26. The system of claim 23 in which molding is performed to create more contiguous free space in the core area.

27. The system of claim 23 in which a B* tree approach is employed to place the core objects.

28. The system of claim 23 further comprising performing preliminary placement of the core objects.

29. The system of claim 28 in which the preliminary placement is performed for objects having location or proximity preferences.

30. The system of claim 23 in which the core objects are sorted for placement.

31. The system of claim 23 in which recursive placement is implemented for different hierarchical levels of design elements in the electronic product.

32. The system of claim 23 in which the core objects may be subject to aspect ratio changes for placement.

33. The system of claim 23 in which the programmable code includes instructions for performing a third pass placement in which the third pass placement permits shape overlaps for the core objects.

* * * * *